United States Patent
Rui et al.

(10) Patent No.: US 10,057,764 B2
(45) Date of Patent: Aug. 21, 2018

(54) PRIVACY PRESERVING SENSOR APPARATUS

(71) Applicant: Microsoft Corporation, Redmond, WA (US)

(72) Inventors: Yong Rui, Beijing (CN); Daniel Morris, Bellevue, WA (US); Andrew D. Wilson, Seattle, WA (US); Nikunj Raghuvanshi, Redmond, WA (US); Desney S. Tan, Kirkland, WA (US); Jeannette M. Wing, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/158,800

(22) Filed: Jan. 18, 2014

(65) Prior Publication Data

US 2015/0208233 A1    Jul. 23, 2015

(51) Int. Cl.
*H04W 12/02* (2009.01)
*G06F 21/62* (2013.01)
*G06F 21/83* (2013.01)

(52) U.S. Cl.
CPC ........ *H04W 12/02* (2013.01); *G06F 21/6245* (2013.01); *G06F 21/83* (2013.01); *G06F 2221/031* (2013.01)

(58) Field of Classification Search
CPC .... H04W 12/02; G06F 21/83; G06F 21/6245; G06F 2221/031
See application file for complete search history.

(56) References Cited

U.S. PATENT DOCUMENTS

| | | | |
|---|---|---|---|
| 6,067,399 A * | 5/2000 | Berger | 386/280 |
| 7,362,355 B1 | 4/2008 | Yang et al. | |
| 2006/0134904 A1* | 6/2006 | Araki et al. | 438/618 |
| 2006/0198520 A1* | 9/2006 | Courtney et al. | 380/247 |
| 2008/0215318 A1* | 9/2008 | Zhang et al. | 704/231 |

(Continued)

FOREIGN PATENT DOCUMENTS

| | | |
|---|---|---|
| EP | 2157781 A1 | 2/2010 |
| WO | 2013040485 A2 | 3/2013 |

OTHER PUBLICATIONS

"International Search Report & Written Opinion Received for PCT Application No. PCT/US2015/011075", dated Apr. 24, 2015, 9 Pages.

(Continued)

*Primary Examiner* — Meng Li
(74) *Attorney, Agent, or Firm* — Medley, Behrens & Lewis, LLC

(57) ABSTRACT

A privacy preserving sensor apparatus is described herein. The privacy preserving sensor apparatus includes a microphone that is configured to output a signal that is indicative of audio in an environment. The privacy preserving sensor apparatus further includes feature extraction circuitry integrated in the apparatus with the microphone, the feature extraction circuitry configured to extract features from the signal output by the microphone that are usable to detect occurrence of an event in the environment, wherein the signal output by the microphone is unable to be reconstructed based solely upon the features.

20 Claims, 7 Drawing Sheets

106

(56) References Cited

U.S. PATENT DOCUMENTS

| | | | |
|---|---|---|---|
| 2010/0182447 A1* | 7/2010 | Namba et al. | 348/222.1 |
| 2011/0190008 A1 | 8/2011 | Eronen et al. | |
| 2012/0047374 A1* | 2/2012 | Klum et al. | 713/192 |
| 2012/0295637 A1 | 11/2012 | Hannuksela et al. | |
| 2012/0303360 A1* | 11/2012 | Grokop et al. | 704/201 |
| 2012/0316869 A1* | 12/2012 | Xiang | H04K 1/02 704/226 |
| 2014/0188473 A1* | 7/2014 | Lambdin et al. | 704/251 |
| 2016/0005394 A1* | 1/2016 | Hiroe | G10L 15/04 704/248 |

OTHER PUBLICATIONS

Yonezawa, et al., "Privacy Protected Life-context-aware Alert by Simplified Sound Spectrogram from Microphone Sensor", In Proceedings of the 5th ACM International Workshop on Context-Awareness for Self-Managing Systems, Sep. 18, 2011, 6 pages.

Schroeder, et al., "Detection and Classification of Acoustic Events for In-Home Care", In Ambient Assisted Living, Jan. 25, 2011, 15 pages.

Pleva, et al., "D7.4 Multimodal Features Analysis Component", In European Seventh Framework Programme, Jun. 30, 2011, 95 pages.

Parthasarathi, Shree Hari Krishnan, "Privacy-Sensitive Audio Features for Conversational Speech Processing", In PhD Thesis, Dec. 6, 2011, 151 pages.

Li, et al., "Acoustic Fall Detection Using a Circular Microphone Array", In 32nd Annual International Conference of the IEEE EMBS, Aug. 31, 2010, 4 pages.

Parthasarathi, et al., "Speaker Change Detection with Privacy-Preserving Audio Cues", In Proceedings of the International Conference on Multimodal Interfaces, Nov. 2, 2009, 4 pages.

Wyatt, et al., "Capturing Spontaneous Conversation and Social Dynamics: A Privacy-Sensitive Data Collection Effort", In IEEE International Conference on Acoustics, Speech and Signal Processing, vol. 4, Apr. 15, 2007, 4 pages.

Alu, et al., "Cloaking a Sensor", In Physical Review Letters, vol. 102, Issue 23, Jun. 8, 2009, 5 pages.

"Response to the International Search Report & Written Opinion for PCT Application No. PCT/US2015/011075", Filed Date: Aug. 7, 2015, 9 Pages.

"Response to the Office Action for European Patent Application No. 15702868.9", dated Sep. 29, 2016, 16 Pages.

"Response to the Office Action for Chinese Patent Application No. 201580004765.5", Filed Date: Dec. 22, 2016, 15 Pages.

"International Preliminary Report on Patentability Issued in PCT Application No. PCT/US2015/011075", dated Oct. 8, 2015, 6 Pages.

* cited by examiner

PRIVACY PRESERVING SENSOR APPARATUS

BACKGROUND

Sensor devices are fast becoming ubiquitous. For example, a conventional mobile telephone can include microphones, video cameras, accelerometers, GPS sensors, etc. Some sensors that can be found in the home environment, however, may give rise to privacy concerns for users in the home environment. For example, a conventional television (and/or an accessory for a television) can be equipped with a video camera and microphone. A signal output by a video camera and/or a microphone can be processed by a processing device, and a television can present content to a viewer based upon the processing of such signal. For instance, the viewer can audibly emit the statement "show me movies starring Humphrey Bogart," and the television can present a list of selectable tiles, wherein each tile represents a respective movie starring the aforementioned actor. Likewise, a signal output by the video camera can indicate that the viewer performed a particular gesture, and content can be presented to the viewer based upon the gesture being recognized. For instance, a flick of a wrist can cause a channel to be changed, can cause a volume of audio output by the television and/or associated audio system to be altered, etc.

Generally, when a device that includes a sensor is on, the sensor itself is on and generating data that is indicative of a state of the surroundings of the sensor. Referring to the exemplary scenario noted above, a microphone of a television can capture audio while the television is on, often unbeknownst to a viewer. Still further, some conventional devices are configured to transmit captured signals (or features representative thereof) to a computing device used in a cloud service, wherein the computing device analyzes the signals for purposes of voice recognition, facial recognition, gesture recognition, etc., and performs an action when a word is recognized, when a face is identified, etc. The cloud service then discards the received signals.

As noted above, users may have privacy concerns when their respective actions can be captured by such sensors. For example, a malicious hacker may potentially reprogram a processor that is in communication with the sensor, thereby causing captured signals to be transmitted to a data store chosen by the malicious hacker (e.g., where the signals can be retained and reviewed unbeknownst to a person whose actions are captured in a sensor stream). Further, data transmitted from the device that includes the sensor to the computing device used in the cloud service may include sufficient information to allow words spoken by the viewer to be reconstructed, to allow the viewer to be identified, etc. This again gives rise to privacy concerns, as data can be intercepted during transmission.

SUMMARY

The following is a brief summary of subject matter that is described in greater detail herein. This summary is not intended to be limiting as to the scope of the claims.

Described herein are various technologies pertaining to a sensor apparatus that can be configured to capture signals in a home environment (home) and process such signals while preserving privacy of a person in the home. The sensor apparatus includes at least one sensor, which can be any suitable sensor that outputs data that can be used to detect a desirably detected event. Accordingly, the at least one sensor can be or include a microphone, a camera, an accelerometer, a vibration sensor, etc. The sensor is tightly coupled to feature extraction circuitry that is configured to extract features from a signal output by the sensor. For purposes of explanation, the sensor will be described as being a microphone, although aspects described herein are not intended to be limited to microphones. In an exemplary embodiment, the microphone can be integrated with the feature extraction circuitry. Therefore, for instance, the microphone can be embedded in an integrated circuit (IC) together with the feature extraction circuitry. Thus, pursuant to an example, the microphone can be an embedded micro-electrical mechanical system (MEMS) microphone that is embedded in silicon together with the feature extraction circuitry. Accordingly, the sensor apparatus is designed such that an attempt to modify the hardware (to allow the signal output by the microphone to be intercepted) results in the microphone and/or associated feature extraction circuitry being damaged such that the sensor apparatus is unable to function.

The feature extraction circuitry is configured to receive the signal output by the microphone and extract features therefrom, wherein the features can be used to detect a desirably detected event, but are unable to be used to reconstruct the signal output by the microphone. For example, the sensor apparatus can be employed to detect the event of a child is crying. It can be ascertained that features extracted from the signal output by the microphone can be indicative of whether or not the child crying. An owner of the sensor apparatus, however, may desire that words uttered in proximity to the microphone are not analyzed for semantics (e.g., the owner of the sensor apparatus may feel that her privacy is invaded when semantics of her conversations are analyzed). The feature extraction circuitry can extract features from the signal output by the microphone that allow for detection of the desirably detected event (e.g., the child crying), while such features are unable to be used to perform semantic analysis or otherwise reconstruct the signal output by the microphone.

In another exemplary embodiment, the sensor apparatus can be configured to extract features that can be used to perform machine translation of a predefined set of words in a language of an owner of the sensor apparatus. Thus, the feature extraction circuitry can extract features from the signal output by the microphone that can be utilized by a machine translation system to detect that a person has spoken a word in the predefined set of words. The features extracted by the feature extraction circuitry, however, may not include sufficient information to allow the machine translation system to recognize words outside of the predefined set. Features of the signal not extracted by the feature extraction circuitry are immediately discarded.

The sensor apparatus may further include a wireless transceiver that can transmit features extracted from the signal (e.g., output by the microphone) to a computing device utilized in a cloud service (directly or indirectly). The computing device of the cloud service can receive the features and, for example, detect occurrence of a desirably detected event based upon such features. Continuing with an example set forth above, the computing apparatus in the cloud service can identify that the child is crying. An output signal can be transmitted to a notification device, which may be in an environment in which the sensor apparatus is located. The notification device can be configured to notify a person of occurrence of the event.

In an exemplary embodiment, the feature extraction circuitry in the sensor apparatus is preconfigured and static.

Accordingly, a hacker is unable to reprogram the feature extraction circuitry to extract other features from the signal output by the microphone. In another exemplary embodiment, the sensor apparatus can be configured with a plurality of predefined feature extraction modes. For instance, in a first mode, the feature extraction circuitry can be configured to extract a first set of features from a signal output by a microphone, wherein the first set of features are employable to detect semantics in a spoken utterance. In a second mode, the feature extraction circuitry can be configured to extract a second set of features from a signal output by the microphone, wherein the second set of features include information that can be used to determine an identity of a speaker. In a third mode, the feature extraction circuitry can be configured to extract a third set of features from a signal output by the microphone, wherein the third set of features include information that can be used to detect when a child is crying. The first set of features, however, may not include sufficient information to allow for detection of identity of a speaker or detection of when a child is crying. Similarly, the second set of features may not include sufficient information to allow for detection of semantics of spoken words or when a child is crying. Likewise, the third set of features may not include sufficient information to allow for detection of semantics of spoken words or detection of an identity of a speaker. Thus, the feature extraction circuitry can comprise three separate circuits, only one of which can be active at a given point in time.

Such a sensor apparatus can be particularly well-suited for a variety of different applications. In an exemplary embodiment, the sensor apparatus can be employed in connection with a television, game console, or the like. For instance, with respect to a television that supports recognition of voice commands, the sensor apparatus can be configured to extract features that can be used by a voice recognition system to identify a relatively small number of words (voice commands); however, the voice recognition system may be unable to detect other words using such features. Further, the sensor apparatus may be particularly well-suited for a home security application, wherein the sensor apparatus is configured to extract features from an audio signal that can be used to identify a window breaking, a door being broken open, etc. The extracted features, however, may be unable to be used to reconstruct the signal output by the microphone, and may be further unable to be used to identify words in speech. The sensor apparatus may further be particularly well-suited for applications where a person may need assistance. For instance, for a person who is somewhat elderly, it may be advantageous to include such a sensor apparatus in the home to detect a fall, a cry for help, or the like, while alleviating privacy concerns of the person.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
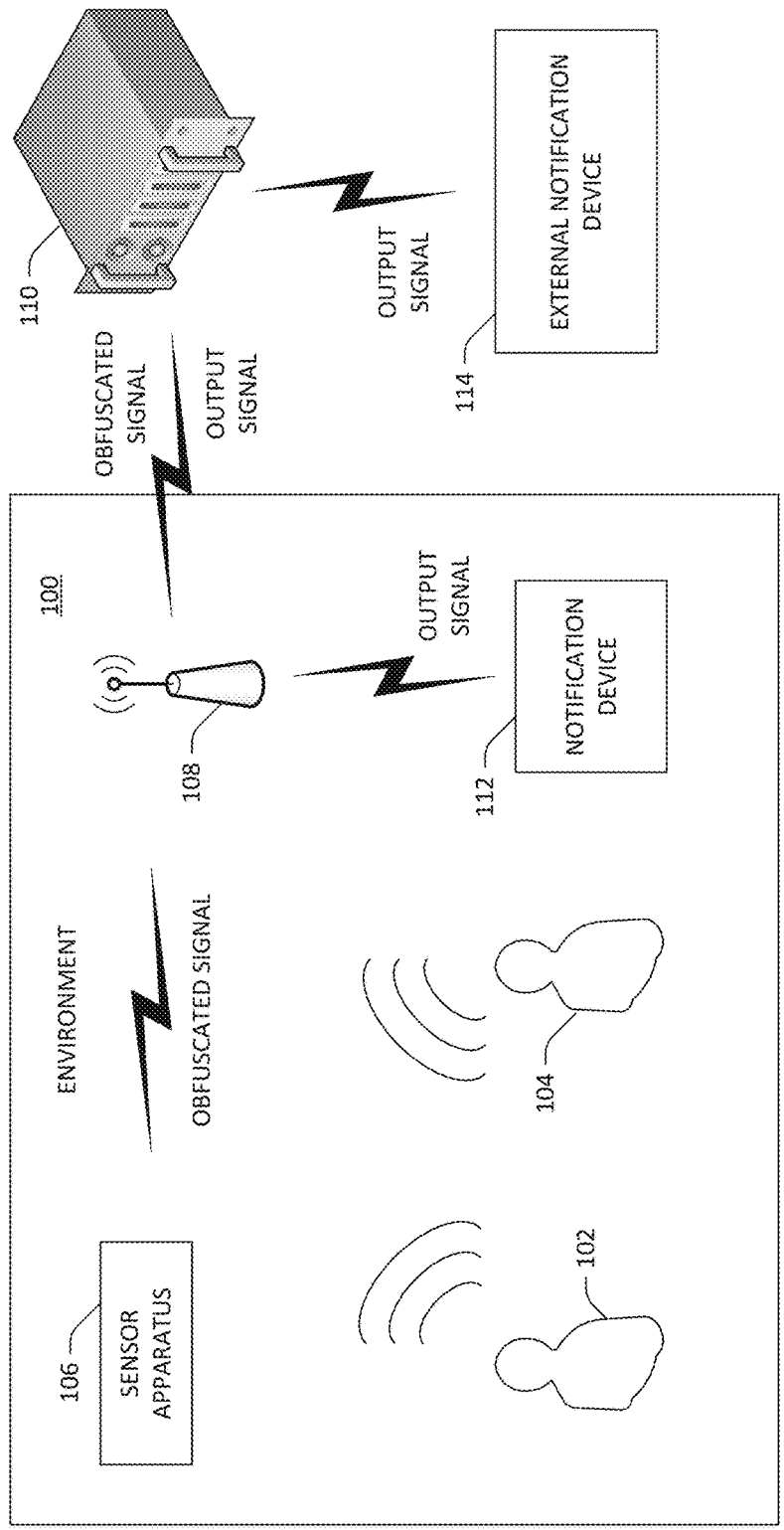
FIG. 1 illustrates an exemplary environment that includes a privacy preserving sensor apparatus.

Various technologies pertaining to a privacy preserving sensor apparatus are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by a single system component may be performed by multiple components. Similarly, for instance, a single component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary environment 100, where privacy of people therein is of concern, is illustrated. Accordingly, the environment 100 may be a room in a home, a home in general, a conference room, an office, a hospital room, or other areas where people perceive a right to privacy. In the environment 100, a first person 102 and a second person 104 are shown as conversing with one another. In the case where the environment 100 is a home, the first person 102 and the second person 104 can desire that their conversation and associated actions remain private (e.g., remain solely between the first person 102 and the second person 104). The environment 100 includes a privacy preserving sensor apparatus 106, which will be referred to herein as the sensor apparatus 106. Generally, the sensor apparatus 106 is configured to generate data that can be used to detect an occurrence of a desirably detected event in the environment 100, such as a child crying, a cry for help, a break-in to the environment 100, speaking of a particular word, performance of a particular gesture, etc. Operation of the sensor apparatus 106, however, desirably is not in contrast with notions of privacy held by the first person 102 and the second person 104.

As will be described in greater detail below, the sensor apparatus 106 can include a sensor, such as a video camera, a microphone, an inertial sensor, a light sensor, a thermometer, or the like, wherein the sensor can output a signal that is indicative of a parameter pertaining to the environment 100, such as an action being performed by the first person 102, a word spoken by the second person 104, etc. Thus, the signal can include content that the first person 102 and/or the second person 104 believes to be private. For purposes of explanation, the sensor in the sensor apparatus 106 is described as being a microphone; it is to be understood, however, that aspects described herein are not limited to a microphone.

The microphone in the sensor apparatus 106 is configured to output a signal that is indicative of audio in the environment, which can include a conversation between the first person 102 and the second person 104. The sensor apparatus 106 also includes circuitry that extracts features from the signal output by the microphone that can be used to detect an occurrence of the desirably detected event, but which cannot be used to reconstruct the original signal output by the microphone (or detect events that are not desired to be detected by the first person 102 and/or the second person 104). For instance, the features extracted from the signal output by the microphone can include insufficient information to allow semantics of a conversation to be understood (e.g., by a machine translation system), can include insufficient information to allow for an identity of a speaker to be ascertained (e.g., by a voice recognition system), etc. In an example, the desirably detected event may be a child crying; accordingly, a set of features can be extracted from the signal output by the microphone, wherein the set of features includes information that enables a computer-implemented detection system to detect that a child is crying, but the set of features includes insufficient information to enable a computer-implemented machine translation system to perform a semantic analysis over spoken words (for example). Features not extracted from the signal output by the microphone for the purposes of detecting the desirably detected event are immediately discarded.

In the exemplary environment 100, the sensor apparatus 106 can include a transceiver, and can transmit an obfuscated signal to a wireless access point 108. The obfuscated signal is based upon the signal output by the microphone, and comprises (potentially compressed and/or encoded) features extracted from the signal output by the microphone. While shown as being in the environment 100, it is to be understood that the wireless access point 108 can be external to the environment 100 (e.g., the wireless access point 108 can be a cellular antenna). The wireless access point 108 may then transmit the obfuscated signal to a computing device 110 that is configured to perform a cloud-based service, wherein the cloud-based service is detecting whether or not the desirably detected event has occurred based upon the obfuscated signal received from the access point 108. Continuing with the example set forth above, the computing device 110 can be configured to analyze the obfuscated signal and determine whether or not the child is crying based upon such analysis.

When the computing device 110 detects occurrence of the desirably detected event, the computing device 110, in an exemplary embodiment, can transmit an output signal to the access point 108 in the environment 100. The output signal can identify a particular notification device 112 in the environment 100 that is configured to notify a person (e.g., the first person 102 or the second person 104) when the desirably detected event has occurred. The wireless access point 108 may then transmit the output signal to the notification device 112, which can generate an output that notifies the person that occurrence of the desirably detected event has been detected. The notification device 112 may be or include an alarm, a computing device (such as a mobile telephone, a tablet (slate) computing device, a laptop computing device, a wearable computing device, etc.), a television, a game console, or other device that is configured to notify the person that the event has been detected. The first person 102 and/or the second person 104 receive the benefit by being notified of occurrence of the event, without the privacy concerns associated with conventional home sensors.

As shown, in another exemplary embodiment, the cloud service 110 can be configured to output the output signal to an external notification device 114. This embodiment may be particularly well-suited for situations where it is desirable to inform a person outside of the environment 100 of the occurrence of the event in the environment 100. For example, if the environment 100 is a home of an elderly and/or sickly person, the sensor apparatus 106 can be used in connection with detecting a fall and/or a call for help. The computing device 110 can detect such event based upon the obfuscated signal output by the sensor apparatus 106, and can transmit the output signal to the external notification device 114, which may be associated with a hospital, police, a remote caretaker, or the like.

In another exemplary embodiment, rather than transmitting the obfuscated signal to the computing device 110, the sensor apparatus 106 can transmit the signal to a computing device designated by the owner of the sensor apparatus 106, such as a computing device in the environment 100. Such computing device may be configured to detect occurrence of the desirably detected event based upon the obfuscated signal.

Applications in which the sensor apparatus 106 is particularly well-suited are now set forth. It is to be understood, however, that the exemplary applications set forth herein are not intended to be limiting, but are set forth to illustrate various advantages corresponding to the sensor apparatus 106. The sensor apparatus 106 can include a microphone that generates a signal that is indicative of audio in the environment 100. The sensor apparatus 106 can be included in or associated with a device that is configured to provide multimedia content to a person responsive to receiving voice commands from the person. The device can therefore be a television, a set top box, a streaming media device, a game console, etc. In this example, the desirably detected event is that the person has set forth a voice command, and the output signal causes content to be presented to the person, thereby notifying the person that the event has been detected.

The voice commands can be predefined, and circuitry in the sensor apparatus 106 can be configured to extract features from a signal output by the microphone in the sensor apparatus 106, wherein the computing device 110 can determine whether or not the person has set forth a spoken utterance based upon the extracted features. The features, however, cannot be used to reproduce the original signal output by the microphone, and may include insufficient information to identify the person that set forth the spoken utterance. In another example, the features extracted from the signal output by the microphone may include insufficient information to identify when the person has spoken words outside of the predefined set of voice commands. Accordingly, the person 102 and/or the person 104 can interact with the television, game console, and each other without fearing that the sensor apparatus 106 is retaining or transmitting the clear (not obfuscated) signal output by the microphone.

Further, the sensor apparatus 106 may be particularly well-suited for use in connection with home security. Thus, circuitry in the sensor apparatus 106 can be configured to extract features from a signal output by the microphone, wherein such features can be analyzed to determine whether or not the sound of a window breaking has occurred. The extracted features, however, in such an embodiment, include insufficient information to allow a machine translation system to reconstruct a privately held conversation between the first person 102 and the second person 104. In a similar application, the sensor apparatus 106 can be used in connection with remote patient monitoring, where it is desirable to detect occurrence of events such as falls, cries for help, or the like. As with the other applications, circuitry in the sensor apparatus 106 extracts features that include sufficient information to enable a computer-implemented detection system to detect occurrence of the desirably detected events, while the extracted features include insufficient information to allow for the original microphone signal to be reconstructed or a machine translation system to identify spoken words.

Figure 2:
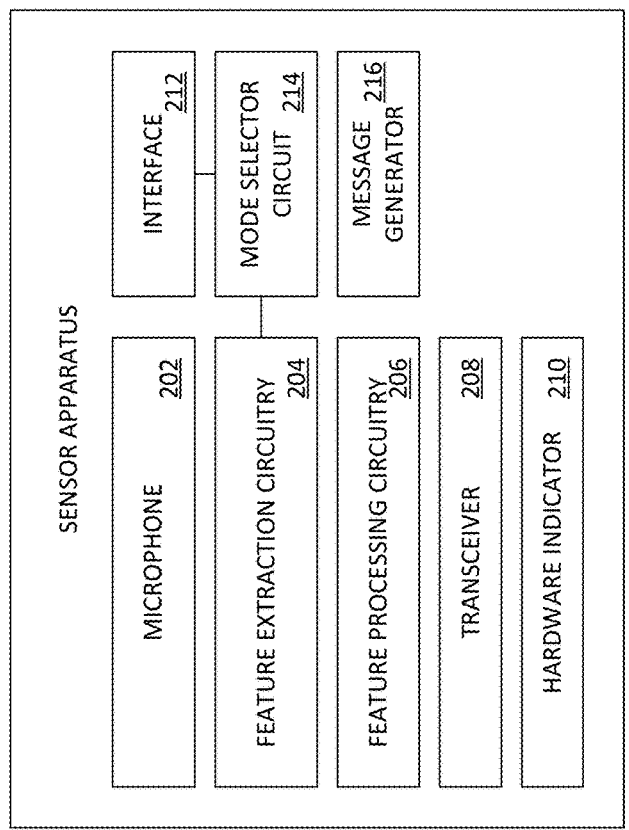
FIG. 2 illustrates an exemplary privacy preserving sensor apparatus.

Now referring to FIG. 2, a functional block diagram of the sensor apparatus 106 is illustrated. The sensor apparatus 106 includes a microphone 202 that is configured to detect acoustic vibrations in the environment 100 and output a signal that is representative of such vibrations. Pursuant to an example, the sensor apparatus 106 may be included in a tamper-resistant housing, which can be configured to damage the microphone 202 when subjected to tampering.

The sensor apparatus 106 additionally includes feature extraction circuitry 204 that receives the signal output by the microphone 202 and extracts certain features therefrom, wherein the features are usable by a computing device (e.g., the computing device) to detect a desirably detected event. The feature extraction circuitry 204 is tightly coupled with the microphone 202, wherein the tight coupling is undertaken to prevent a malicious hardware hacker from attempting to intercept or otherwise acquire the signal output by the microphone 202 prior to the signal being received by the feature extraction circuitry 204. Thus, the microphone 202 and the feature extraction circuitry 204 are integrated together in the sensor apparatus 106. In an exemplary embodiment, the microphone 202 and the feature extraction circuitry 204 can be co-located on a semiconductor chip. Thus, the microphone 202 may be a micro-electrical mechanical system (MEMS) microphone that is embedded in a silicon chip that includes the feature extraction circuitry 204. In such a configuration, a hardware hacker attempting to extract the signal output by the microphone 202 prior to such signal reaching the feature extraction circuitry 204 would likely extensively damage the sensor apparatus 106, rendering the microphone 202 unusable.

In an exemplary embodiment, the feature extraction circuitry 204 can be an Application Specific Integrated Circuit (ASIC) or other preconfigured circuit that is not reconfigurable after it has been fabricated. In such an embodiment, there is no software that can be hacked. Therefore, there is no fear that a malicious hacker will modify software to cause the feature extraction circuitry 204 to extract additional features or fail to discard desirably discarded features. In another exemplary embodiment, where an owner of the sensor apparatus 106 believes the benefits of configurability outweigh the risk of a software hack, the feature extraction circuitry 204 can be implemented in a field programmable gate array (FPGA), a general-purpose processor, or the like. The output of the feature extraction circuitry 204 can be the obfuscated signal. In another exemplary embodiment, cryptographic circuitry can be used to encrypt the features extracted by the feature extraction circuitry 204.

Moreover, in an exemplary embodiment, the feature extraction circuitry 204 can be configured to "fuzz" data in the signals in time, such that an entity that intercepts the signal will have difficulty decoding content of the signal based upon temporal patterns therein. In such an embodiment, the feature extraction circuitry 204 can be configured with information that is indicative of precision in time that is necessary for analyzing extracted features, and the feature extraction circuitry 204 can modify timing corresponding to extracted features to allow for event detection while "fuzzing" temporal characteristics of events encoded in the signal. In another example, the feature extraction circuitry 204 can encrypt extracted features, and assign time stamps to respective data packets. A recipient application can then decrypt the extracted features. In yet another example, a circuit or application that processes the extracted features can, from time to time, poll the sensor apparatus 106 for the extracted features. Other techniques are also contemplated for obfuscating features in time.

The sensor apparatus 106 further optionally includes feature processing circuitry 206 that can perform event detection (e.g., rather than the computing device 110 performing event detection) based upon features output by the feature extraction circuitry 204. In some embodiments, it may be desirable for event detection to occur locally at the sensor apparatus 106, such as when it is more economical to do so, when latency associated with a network is not acceptable for the application in which the sensor apparatus 206 is used, etc. Pursuant to an example, the feature processing circuitry 206 can be co-located on a silicon substrate with the feature extraction circuitry 204 and the microphone 202.

The sensor apparatus 106 also includes a transceiver 208 that can transmit the obfuscated signal output by the feature extraction circuitry 204 to the access point 108. The transceiver 208 may be configured as a Wi-Fi radio chip, a Bluetooth chip, an optical emitter that can emit optical signals, an acoustic emitter, or the like. When the sensor apparatus includes the feature processing circuitry 206, the transceiver 208 can be configured to transmit the output signal to the notification device 112 and/or the external notification device 114. The sensor apparatus 106 may also optionally include a hardware indicator 210 is in communication with the feature processing circuitry 206, wherein the hardware indicator 210 indicates that the feature processing circuitry 206 has detected occurrence of an event. For example, the hardware indicator 210 may be a light emitting diode (LED) that emits an optical signal when the feature processing circuitry 206 has detected occurrence of the event based upon the obfuscated signal output by the feature extraction circuitry 204. In another example, the hardware indicator 210 may be a speaker that outputs an audio signal when occurrence of the desirably detected event has been detected. In still yet another example, the hardware indicator 210 may cause the sensor apparatus 106 to vibrate.

In another exemplary embodiment, the sensor apparatus 106 can be a multi-modal sensor apparatus. While not shown, the feature extraction circuitry 204 may include multiple different feature extraction circuits, with each circuit corresponding to a respective different mode of operation of the sensor apparatus 106 (and a respective different desirably detected event). For instance, in a first mode of operation, the sensor apparatus 106 can be configured to facilitate detecting semantics of a conversation. In a second mode of operation, the sensor apparatus 106 can be configured to facilitate detecting when a particular person is speaking (e.g., identify a speaker). In a third mode of operation, the sensor apparatus 106 can be configured to facilitate detecting when a child leaves a "safety zone" in a home. Other modes are also contemplated, and the above are set forth merely as examples.

To allow the user to switch modes of operation of the sensor apparatus 106, the sensor apparatus 106 can optionally include an interface 212, which can be a button, a click wheel, a slider, etc. A user of the sensor apparatus 106 can select a desired mode of operation mode of the sensor apparatus 106 through interaction with the interface 212. An optionally included mode selector circuit 214 can select a feature extraction circuit in the feature extraction circuitry 204 based upon the interaction of the user with the interface 212 (e.g., the mode of operation selected by the user). For instance, the mode selector circuit 214 can direct the signal output by the microphone to the first feature extraction circuit when the first mode of operation is selected (while preventing other feature selection circuits from receiving such signal), can direct the signal to the second feature extraction circuit when the second mode of operation is selected (while preventing other feature selection circuits from receiving such signal), and so on.

In an example, the interface 212 may be a button, and a person can press such button to select the first mode of operation. The sensor apparatus is thus caused to generate an obfuscated signal that can be used by a machine translation system to detect semantics of human speech, but which includes insufficient information to enable a voice recognition system to detect an identity of the speaker or a computer-implemented detection system to detect the cry of the child. The user can subsequently again select the button, causing the mode of operation of the sensor apparatus 106 to change to the second mode. Therefore, it can be ascertained that the sensor apparatus 106 is multi-modal.

The sensor apparatus 106 may further optionally include a message generator 216 that can generate a message for provision to a computing device (for eventual consumption by a person). The message generator 216 can be in communication with the feature processing circuitry 206, and can receive an indication from the feature processing circuitry 206 that a particular event has been detected by the sensor apparatus 106. The message generator 216 can then generate a message that is to be transmitted to a computing device of a person who is to be notified of occurrence of an event. For instance, the message generator 216 can generate a text message, and the transceiver 208 can be configured to transmit the text message to a specified mobile device of the person. In another example, the message generator 216 can generate an email, a voice message, or other suitable notification.

Figure 3:
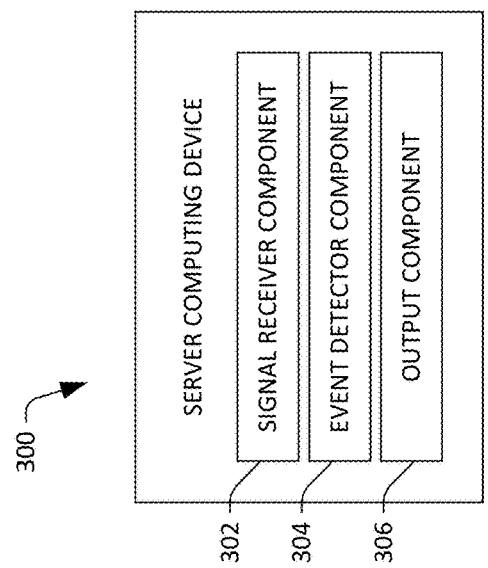
FIG. 3 illustrates an exemplary server computing device that can receive features from a privacy preserving sensor apparatus and detect an event based upon such features.

Referring now to FIG. 3, an exemplary computing device 300 that can be configured to detect occurrence of a desirably detected event based upon a received obfuscated signal output by the sensor apparatus 106 is illustrated. For example, the computing device 300 may be the computing device 110. In another example, the computing device 300 may be a computing device located in the environment 100 (e.g., a desktop computing device, a game console, a slate computing device, a wearable, etc.). The computing device 300 includes a signal receiver component 302 that receives an obfuscated signal output by the sensor apparatus 106 (e.g., directly or by way of the access point 108). The computing device 300 further includes an event detector component 304 that receives the obfuscated signal and is configured to ascertain whether or not a predefined event has occurred based upon the obfuscated signal. Exemplary events they can be detected by the event detector component 304 include, for example, whether or not an elderly person has fallen or needs help, whether a child stays in a particular area of a house, whether a burglar is attempting to break into a house, etc. Other exemplary events have been noted above. The computing device 300 further includes an output component 306 that can output a signal when the event detector component 304 detects that the event has occurred based upon the obfuscated signal received by the signal receiver component 302. For instance, the output component 306 can transmit the signal indicating that the event has occurred to the notification device 112 and/or the external notification device 114.

FIGS. 4-7 illustrate exemplary methodologies relating to construction and use of a privacy-preserving sensor. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 4:
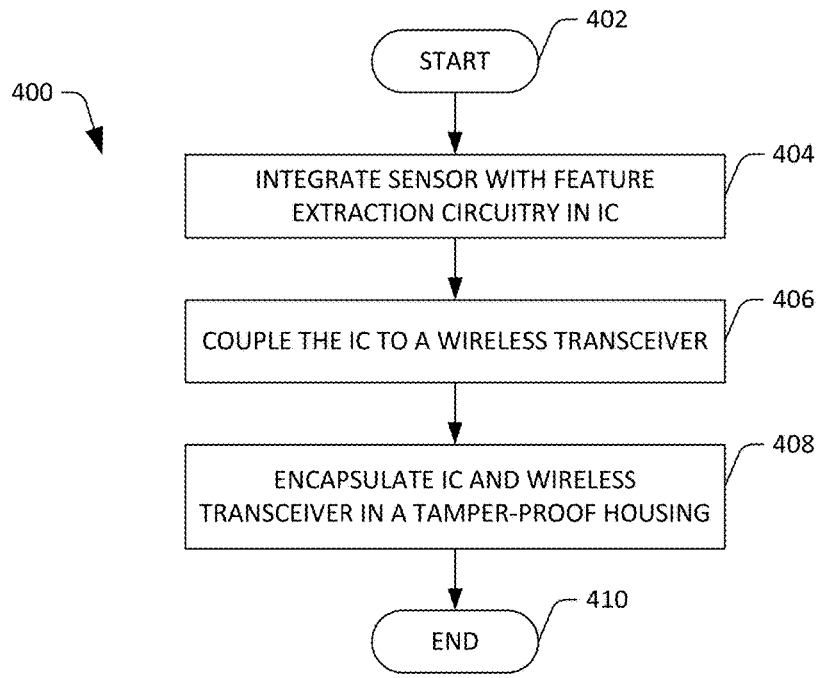
FIG. 4 is a flow diagram illustrating an exemplary methodology for constructing a privacy preserving sensor apparatus.

With reference now to FIG. 4, an exemplary methodology 400 that facilitates constructing a privacy preserving sensor apparatus is illustrated. The methodology 400 starts at 402, and at 404, a sensor is integrated with feature extraction circuitry. For instance, the sensor and the feature extraction circuitry can be included together in an integrated circuit (e.g., a single chip can include the sensor and the feature extraction circuitry). At 406, the integrated circuit is coupled to a wireless transceiver. In another exemplary embodiment, the wireless transceiver may also be included in the integrated circuit, such that it is integrated with the sensor and the feature extraction circuitry. At 408, the integrated circuit (and optionally the wireless transceiver) is encapsulated in a tamper-resistant housing. As noted above, the feature extraction circuitry is configured to extract a certain set of features from a sensor signal, wherein such features can be used to detect the event but cannot be used to reconstruct the original signal (thereby preserving privacy of people in a location in which the privacy preserving sensor is deployed). In an exemplary embodiment, features that can be extracted from the signal include features other than phase information (which is indicative of words in a spoken language). In another example, prosody features, such as pitch and sub-band energies, can be extracted from the signal output by the microphone, while the remainder of the signal is discarded. The methodology 400 completes at 410.

Figure 5:
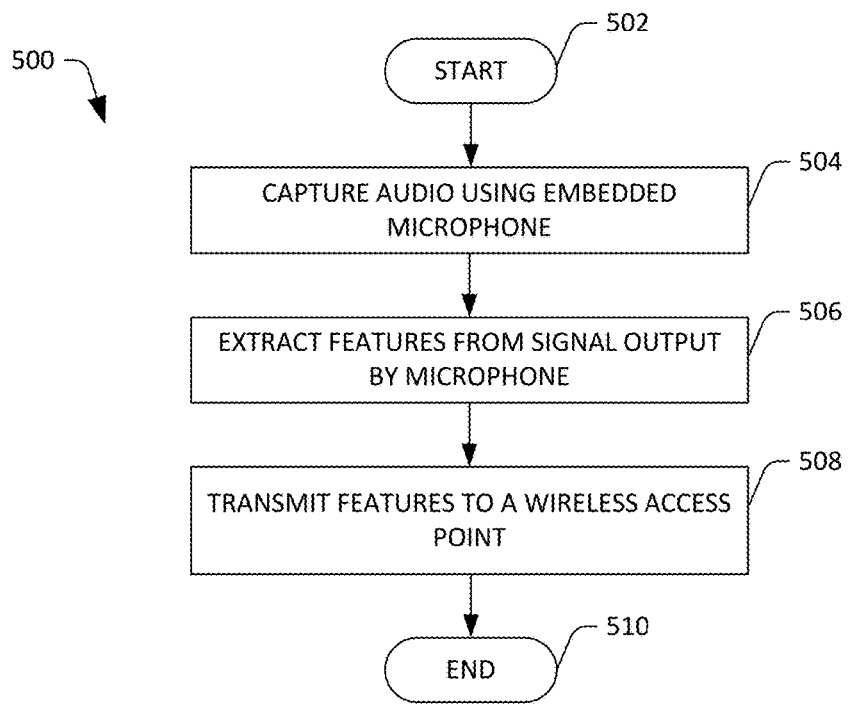
FIG. 5 is a flow diagram illustrating an exemplary methodology pertaining to operation of a privacy preserving sensor apparatus.

Turning now to FIG. 5, an exemplary methodology 500 that facilitates generation and transmittal of an obfuscated signal is illustrated. The obfuscated signal comprises features extracted from a signal output by a sensor, wherein the original signal output by the sensor is unable to be reconstructed through use of the obfuscated signal. The methodology 500 starts at 502, and at 504, audio is captured using, for example, a microphone that is embedded in silicon together with feature extraction circuitry. At 506, features are extracted from the signal output by the sensor. At 508, the features are transmitted to a wireless access point (e.g., the features form of an obfuscated signal). Subsequently, the obfuscated signal may be transmitted to a computing device used by a cloud service to detect occurrence of an event in the environment in which the privacy preserving sensor is deployed. The methodology 500 completes at 510.

Figure 6:
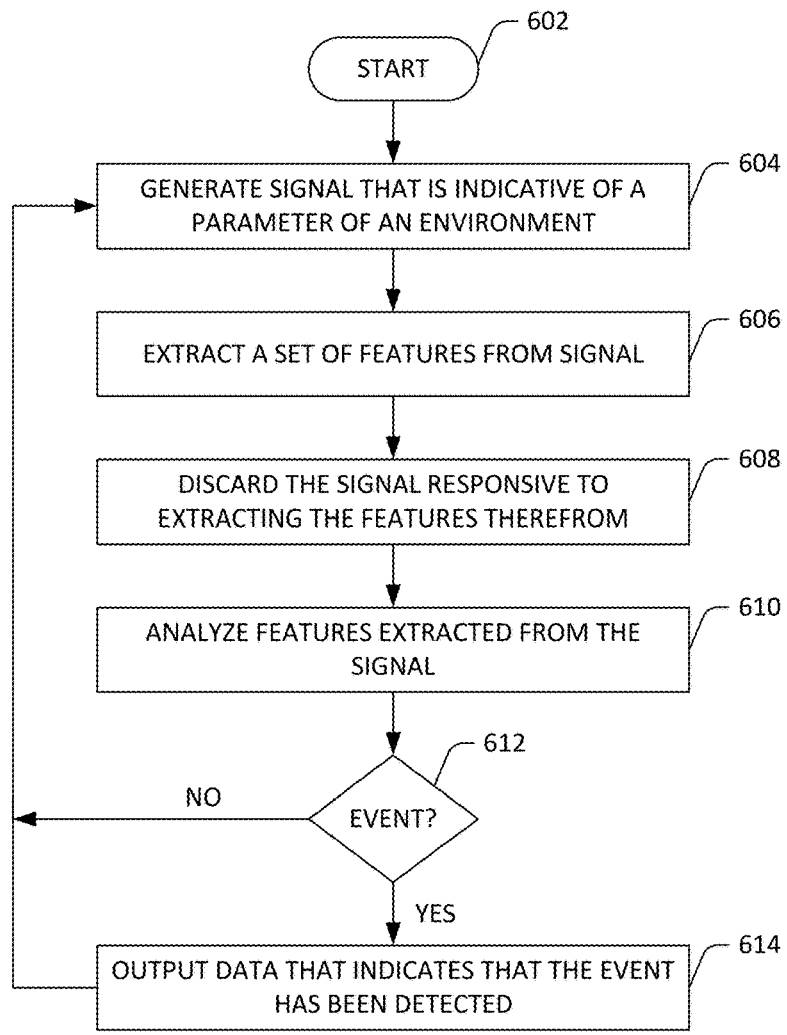
FIG. 6 is a flow diagram that illustrates an exemplary methodology that is performable by a privacy-preserving sensor apparatus.

With reference now to FIG. 6, an exemplary methodology 600 that can be performed by a privacy-preserving sensor apparatus is set forth. The methodology 600 starts at 602, and at 604 a sensor in the sensor apparatus generates a signal that is indicative of a parameter of an environment that includes the sensor apparatus. For instance, the signal can be a video signal (comprising multiple images), an audio signal, a temperature signal, etc.

At 606, a feature set is extracted from the signal generated by the sensor. As indicated above, the feature set can be used to detect an event, but cannot be used to reconstruct the above-mentioned signal. Further, the feature set can be used to detect the event, but can include insufficient information to allow for detection of desirably undetected events. Moreover, the circuitry used to extract the features can be tightly integrated with the sensor.

At 608, responsive to the feature set being extracted from the signal, the signal is discarded (such that only the feature set remains of the signal). For instance, the sensor apparatus can include a buffer, which can be used to retain one or more frames. Feature extraction circuitry can extract features from content of the buffer, and the buffer can then be updated with a most recent frame (or frames). Accordingly, a malicious hardware hacker is unable to retrieve or recreate the original signal by deconstructing the sensor apparatus.

At 610, the sensor apparatus is configured to analyze the features extracted at 608. For example, the sensor apparatus can include event detection circuitry that is configured to analyze the extracted features and determine whether an event (which the sensor apparatus is configured to detect) has occurred based upon the features. At 612, a determination is made regarding whether the event has been detected. When the event is not detected, the methodology 600 returns to 604. When the event is detected, at 614 data is output that indicates that the event has been detected. The data can be a signal transmitted to a computing device, an audio signal, a visual signal, or the like.

Figure 7:
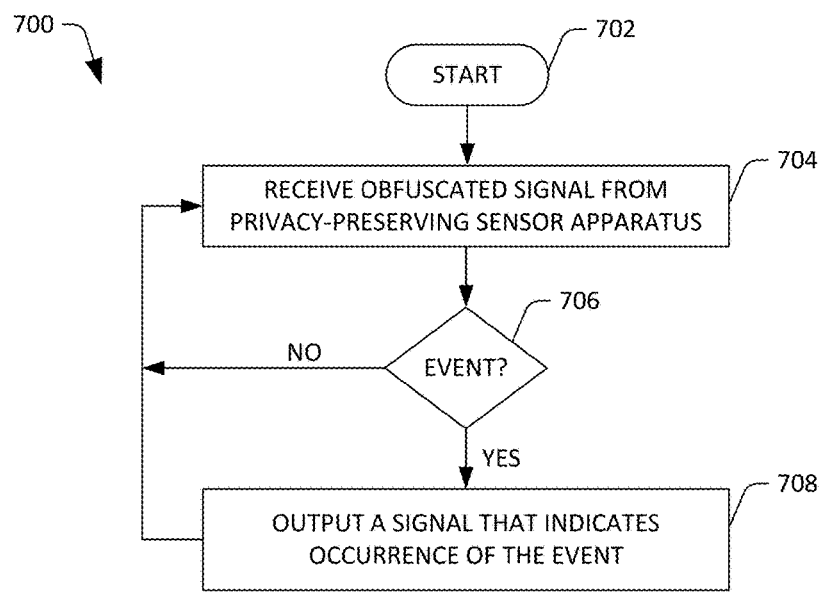
FIG. 7 is a flow diagram that illustrates an exemplary methodology that is performable by a computing device that is configured to detect an event based upon features extracted from a signal output by a sensor.

Referring now to FIG. 7, an exemplary methodology 700 that can be performed by a computing device that is configured to detect an event based upon features extracted from a signal output by a sensor is illustrated. The methodology 700 starts at 702, and at 704 an obfuscated signal is received from a privacy-preserving sensor apparatus. As noted above, the obfuscated signal can comprise features extracted from sensor signal that can be used by the computing device to determine whether a particular type of event has occurred (e.g., child crying), while the features do not include enough information to allow for the computing device to determine whether a desirably undetected event has occurred (e.g., identifying a speaker). At 706, based upon the features in the obfuscated signal, a determination is made regarding whether the desirably detected event has occurred in the environment of the privacy preserving sensor apparatus. If it is determined that the event has not occurred, then the methodology 700 returns to 704. If it is determined at 706 that the event has occurred, then at 708 a signal is output that indicates that the event has occurred. The signal, for example, can be transmitted to notify a person of occurrence of the event, log the event in a data store (e.g., for future analysis), etc. In another example, media content can be presented to a user based upon the detection of the event (e.g., a voice command, gesture, . . . ).

Figure 8:
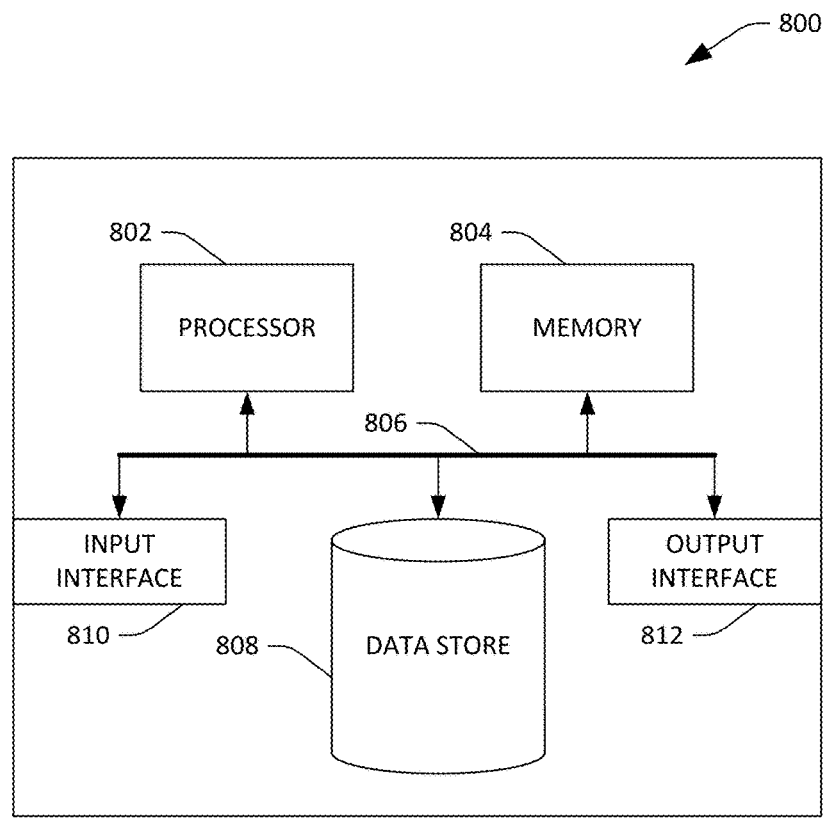
FIG. 8 is an exemplary computing device.

Referring now to FIG. 8, a high-level illustration of an exemplary computing device 800 that can be used in accordance with the systems and methodologies disclosed herein is illustrated. For instance, the computing device 800 may be used in a system that supports detecting occurrences of events, presenting multimedia content to a user, etc. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store features, multimedia content, etc.

The computing device 800 additionally includes a data store 808 that is accessible by the processor 802 by way of the system bus 806. The data store 808 may include executable instructions, features, multimedia content, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A privacy preserving sensor apparatus, comprising:
a semiconductor chip, the semiconductor chip comprising:
a sensor that outputs a signal that is indicative of a parameter in an environment; and
feature extraction circuitry that is co-embedded in the semiconductor chip with the sensor, the feature extraction circuitry configured to:
receive the signal;
extract features from the signal, where the features fail to include phase information, and further wherein the privacy preserving sensor apparatus is configured to discard the signal immediately responsive to the feature extraction circuitry extracting the features from the signal; and
output the features, wherein the privacy preserving sensor apparatus is in communication with an event detection system that is configured to detect occurrence of a first voice event in the environment, the event detection system is configured to detect occurrence of the first voice event in the environment based solely upon the features extracted from the signal, and further wherein a second event detection system that is configured to detect occurrence of a second voice event is unable to detect the second voice event based solely upon the features, the second voice event would otherwise be detectable by the second event detection system if the event detection system had access to the signal output by the sensor.

2. The privacy preserving sensor apparatus of claim 1, further comprising a tamper-resistant housing that encapsulates the semiconductor chip.

3. The privacy preserving sensor apparatus of claim 1, the sensor being a microphone.

4. The privacy preserving sensor apparatus of claim 1, further comprising a transceiver that is configured to receive the features output by the feature extraction circuitry and output an output signal that comprises the features, wherein a computing device that executes the event detection system is operable to receive the output signal output by the transceiver and detect the first voice event based upon the output signal.

5. The privacy preserving sensor apparatus of claim 1, the semiconductor chip further comprising:
second feature extraction circuitry that is co-embedded in the semiconductor chip with the sensor, the second feature extraction circuitry configured to receive the signal and extract second features from the signal, the second voice event in the environment is detectable by the second event detection system based solely upon the second features, the first voice event is unable to be detected by the event detection system based solely upon the second features; and
a mode selector circuit that couples one of the feature extraction circuitry or the second feature extraction circuitry and decouples the other of the feature extraction circuitry or the second feature extraction circuitry with the sensor responsive to receipt of user input.

6. The privacy preserving sensor apparatus of claim 1, further comprising the event detection system, the event detection system configured to output a detection signal responsive to detecting occurrence of the first voice event.

7. The privacy preserving sensor apparatus of claim 6, the event detection system comprising feature processing circuitry that is co-embedded with the sensor and the feature extraction circuitry in the semiconductor chip.

8. The privacy preserving sensor apparatus of claim 6, further comprising a hardware indicator that receives the detection signal output by the event detection system and emits a human-perceivable signal responsive to receiving the detection signal.

9. The privacy preserving sensor apparatus of claim 6, further comprising a message generator that is configured to receive the detection signal output by the event detection system, the message generator configured to generate a human-perceivable message that indicates occurrence of the first voice event in the environment.

10. A method performed at a privacy preserving sensor apparatus, the method comprising:
generating, by a sensor, a sensor signal that is indicative of at least one parameter of an environment in which the privacy preserving sensor apparatus is positioned;
extracting features from the sensor signal, the features failing to include phase information, the features configured for use by a first event detection system to detect occurrence of a first voice event, the features not configured for use by a second event detection system to detect a second voice event that would otherwise be detectable by the second event detection system based upon the sensor signal, wherein feature extraction circuitry that extracts the features from the sensor signal is co-embedded with the sensor in a semiconductor chip;
immediately responsive to extracting the features from the sensor signal, discarding the sensor signal; and
outputting an obfuscated signal to the first event detection system, the obfuscated signal comprising the features, the obfuscated signal not configured for use by the second event detection system to detect the second voice event.

11. The method of claim 10, further comprising:
prior to outputting the obfuscated signal, encrypting the features, wherein the obfuscated signal comprises the encrypted features.

12. The method of claim 10, further comprising:
analyzing the obfuscated signal; and
outputting a signal that indicates that the first voice event has occurred based upon the analyzing of the obfuscated signal.

13. The method of claim 10, wherein the obfuscated signal comprises data that identifies a computing device that is to receive the obfuscated signal, the computing device being a cloud-based computing device that executes the first event detection system.

14. The method of claim 10, the sensor being a microphone.

15. The method of claim 10, further comprising:
receiving user input that indicates that a third voice event is to be detected when the third voice event occurs in the environment;
responsive to receiving the user input, communicatively decoupling the sensor from the feature extraction circuitry;
responsive to receiving the user input, communicatively coupling the sensor with second feature extraction circuitry; and
extracting features from the sensor signal, the features configured for use to detect occurrence of the third voice event while not being configured for use to detect occurrence of the second voice event, wherein the second feature extraction circuitry that extracts the features from the sensor signal is co-embedded with the sensor in the semiconductor chip.

16. The method of claim 10, the sensor being a microelectrical mechanical system microphone.

17. A privacy preserving sensor apparatus, comprising:
a semiconductor chip, the semiconductor chip comprising:
a microphone that is configured to generate a sensor signal that is indicative of at least one parameter of an environment in which the privacy preserving sensor apparatus is positioned; and
feature extraction circuitry co-embedded in the semiconductor chip with the microphone, the feature extraction circuitry configured to:
extract features from the sensor signal, the features failing to include phase information, wherein the privacy preserving sensor apparatus is in communication with an event detection system that is configured to detect a first voice event and a second voice event that is different from the first voice event, the event detection system configured to detect occurrence of the first voice event based solely upon the features extracted from the sensor signal, and further wherein the event detection system is unable to detect the second voice event based upon the features extracted from the signal, the event detection system is configured to detect the second voice event based upon the sensor signal;
discard the sensor signal immediately responsive to extracting the features from the sensor signal; and
output an obfuscated signal to the event detection system, the obfuscated signal comprises the features.

18. The privacy preserving sensor apparatus of claim 17, wherein the first voice event is a spoken word, and the second voice event is an identity of a speaker of the spoken word.

19. The privacy preserving sensor apparatus of claim 17, further comprising the event detection system.

20. The privacy preserving sensor apparatus of claim 17, wherein the obfuscated signal comprises data that identifies a computing device that is to receive the obfuscated signal, the computing device being a cloud-based computing device that executes the event detection system.

* * * * *